Jan. 13, 1931.  H. A. GANT ET AL  1,788,763
CASING HEAD VALVE
Filed Jan. 15, 1929

INVENTORS;
Harry A. Gant and
Harry R. Tipton,
per Arthur J. Farnsworth
THEIR ATTORNEY.

Patented Jan. 13, 1931

1,788,763

UNITED STATES PATENT OFFICE

HARRY A. GANT AND HARRY R. TIPTON, OF LOS ANGELES, CALIFORNIA, ASSIGNORS, BY DIRECT AND MESNE ASSIGNMENTS, TO LESTER F. SCOTT, JR., OF HOLLYWOOD, CALIFORNIA

CASING-HEAD VALVE

Application filed January 15, 1929. Serial No. 332,587.

In this specification, and the accompanying drawing, we shall describe and show a preferred form of our invention, and specifically mention certain of its more important objects. We do not limit ourselves to the forms disclosed, since various changes and adaptations may be made therein without departing from the essence of our invention as hereinafter claimed.

Our invention relates to means for closing off well casings, with special relation to means for extinguishing oil or gas fires that may occur during the drilling or bringing-in the production of oil or gas wells. More particularly it comprises a casing-head valve adapted to shut off the flow from the casing, whether or not there is a drill-rod, sucker-rod, kelly, or other such device protruding from the casing.

In the drilling of deep oil wells, it is common practice to install a gate valve at the upper end of the casing, in order to be able to shut off the flow in case the well comes in under pressure, or in case gases or oil flowing from the well should become ignited. Drilling and similar operations are conducted through the open valve. Although such a valve is perfectly effective for shutting off the flow in cases where there are no drill rods or other devices extending from the casing, the scheme is wholly ineffective where they are present, since it is then impossible to close the head valve without first withdrawing such obstructions.

Among the salient objects of our invention are: First, to provide an improved casing-head valve that is adapted for closing the casing when there are no obstructions extending therefrom; second, to supply a valve that is adapted to function as above, and that is also capable of seating upon a drill rod or other obstruction projecting from the casing, so as to completely close the passage between said obstruction and the casing walls; third, to furnish a casing-head valve that embodies both of the above features and that is also capable of affording full access to the interior of the casing for drilling operations and the like, through the valve; and, fourth, to accomplish the above by means of a relatively simple, inexpensive, and thoroughly dependable construction.

Our objects are acomplished in the manner indicated in the accompanying drawings, in which—

Similar reference numerals refer to similar parts throughout the several views.

Figure 1:
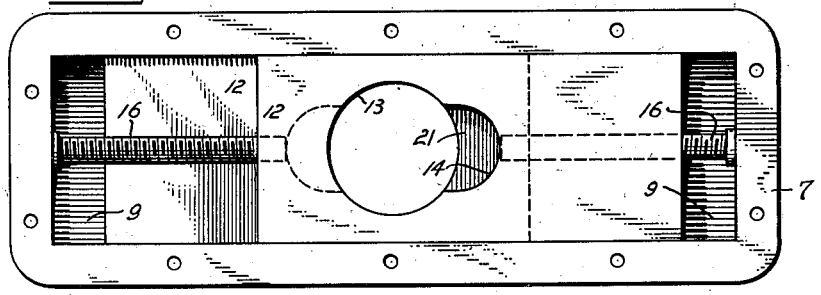
Figure 1 is a plan view of the principal elements of our casing-head valve in full open position, the top cover plate having been removed for the purpose of disclosing the interior parts.

Passing now to a detailed description of our invention, we have illustrated a casing-head valve having a shallow box-like body 5 extending laterally an equal distance on each side of the axis of its flow passage 6. The rim of this box-like body is flanged as shown in 7. A peripherally flanged cover-plate 8 is bolted to the body as indicated, and closes the box-like interior chamber 9 of the valve. The valve body is provided with a central-flanged nozzle 10, constituting its flow passage connection, and the cover plate is similarly provided with a flanged nozzle 11.

Within the box-like interior chamber of the valve, are a pair of superposed slidable plates 12, the combined thickness of which equals, within a few thousandths clearance, the height of the box-like chamber. Similarly their width equals that of the chamber within a few thousandths. These plates are provided with similar but oppositely arranged orifices 13 of special shape. The contour of the orifices is such that, when the valve is in its open position, full access is afforded, through its flow passages and the main portion of its orifices, to the interior of a well casing upon which it is mounted, such position of the working parts being shown in Fig. 1. Each of the orifices is so shaped, on respectively opposite sides of its diameter, as to provide a seating surface 14 for engaging a drill rod or other device that may protrude from the casing through the valve.

Figure 2:
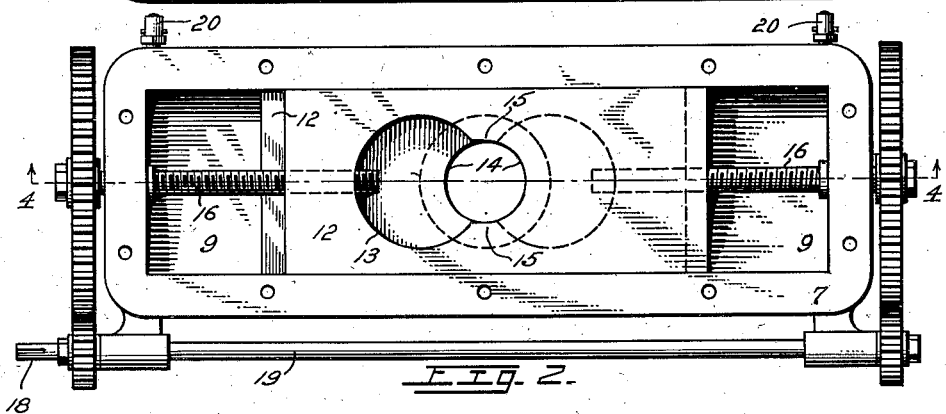
Figure 2 is a complete plan view of our improved valve with top cover plate removed, and the working parts in semi-closed position wherein they are adapted to seat upon a drill rod or other cylindrical device protruding from the casing, and thereby to close the passage between such protruding device and the casing walls.
Figure 3:
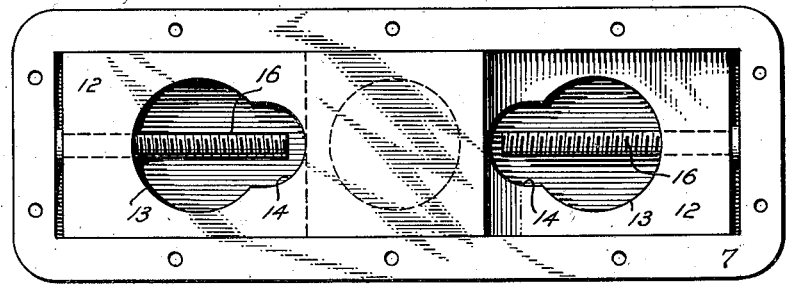
Figure 3 is a plan view similar to Fig. 1, wherein the working parts are positioned to completely close the casing, there being in such a case no drill rods or other devices protruding therefrom.

The position of seating surfaces 14 is arranged with reference to the main portion of the orifices so that when they are seated upon a drill rod, or other device passing through the valve, the respective plates 12 will be overlapped as shown at 15 in Fig. 2. Furthermore the orifices in plates 12 are so positioned in relation thereto that the plates may be overlapped to completely close the flow passage through the valve, as shown in Fig. 3.

Sliding plates 12 are operated by means of screws 16, tapped therethrough and extending therefrom through bearings 17 outwardly from the body of the valve. The screws may be worked independently by means of their outboard extensions, or they may be geared together as shown in Fig. 2, so as to be worked simultaneously. In the latter event one screw thread should be cut right-hand and the other left-hand, so that the plates will move equally in opposite directions. For operating purposes a hand crank may be mounted upon the extension 18 of intermediate shaft 19, or a motor may be geared thereto.

Figure 4:
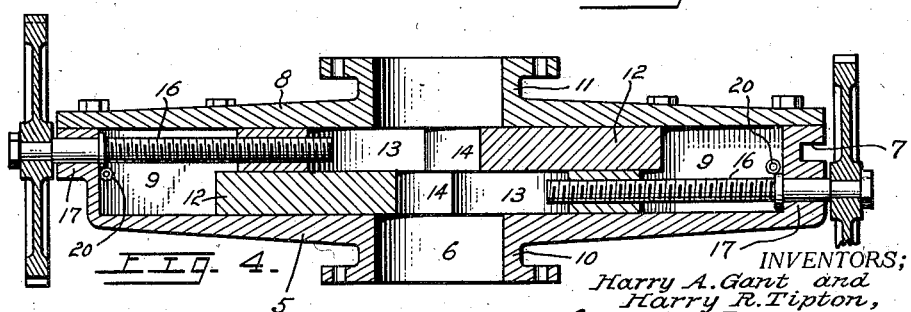
Figure 4 is a central longitudinal section of our improved construction in elevation, the view being taken on the line 4—4 of Fig. 2.

The device we have described is intended primarily for emergency service in connection with oil wells and the like. Its principal purpose is to provide means for shutting off the flow from the well in case of a blowout, and whether or not there is a drill rod or similar device protruding from the casing. It is contemplated that the valve in such service will seldom be operated, and it may remain in open position for long intervals of time. The drilling operations ordinarily call for a more or less constant flow of circulating water, carrying large quantities of mud. Thus Figs. 2 and 4 illustrate alemite nipples 20, whereby grease may be introduced to chamber 9 under pressure, by means of a pressure grease gun. The grease may be forced into the chamber so as to completely fill it, including the screw threads and the interstices between the sliding plates 12, and between the plates and the body and cover. This grease prevents muddy water from entering chamber 9 and the interstices between the working parts, and obviates any deposit of mud therein.

Furthermore the grease will exude under its pressure, so as to more or less fill the shelf 21 upon the lower plate when the working parts of the valve are in the position shown in Fig. 1. Such mud as may accumulate thereon can easily be sheared off when the valve is operated, by reason of the greasy surface of the shelf.

From the foregoing description it will be apparent that our invention is well adapted for use as an emergency device to shut off the flow of gas or oil from wells that suddenly blow-in; and particularly for extinguishing fires that frequently accompany such sudden blowing-in. Obviously the valve may be arranged for remote control from any desired point, as by means of motors or extended shafts and gearing. It will further appear that the valve may be made readily accessible for inspection and cleaning. Its operating condition may be tested from time to time as a measure of precaution, but when this is done the contained grease will be more or less displaced, and an additional supply should be introduced under pressure after testing, to completely fill the working chamber and the interstices between the working parts.

Although we have illustrated a very simple form of construction that embodies the principles of our invention, we do not limit ourselves to such construction except as defined in the appended claims. Thus a number of changes may be made in the construction without departing from the essence of our invention.

Having thus fully described our improved construction in a manner that will be clear to those familiar with the art involved, we claim:

1. A casing-head valve comprising; a valve body providing a chamber intersecting its bore and extending oppositely therefrom; a pair of superposed contracting plates within said chamber extending between its top, bottom, and side walls; and external means for longitudinally moving said plates oppositely; said plates having orifices therethrough adapted to register with said bore.

2. A casing-head valve comprising; a valve body providing a chamber intersecting its bore and extending oppositely therefrom; a pair of superposed contacting plates within said chamber extending between its top, bottom, and side walls; and external means for longitudinally moving said plates oppositely; said plates having orifices therethrough adapted to register with said bore; and said orifices having peripheral surfaces adapted to seat upon an object within said bore, whereby the passage between the object and the wall of the bore may be completely closed.

3. A casing-head valve comprising; a valve body providing a chamber intersecting its bore and extending oppositely therefrom; a pair of superposed contacting plates within said chamber extending between its top, bottom, and side walls; and external means for longitudinally moving said plates oppositely; said plates having orifices therethrough adapted to register with and fully open said bore; and said orifices having portions of their peripheral surfaces adapted to oppositely seat upon the surface of an object within said bore, whereby the passage between the object and the wall of the bore may be completely closed by the overlapping of the plates adjacent the extremities of said peripheral portions.

4. A casing-head valve comprising; a valve body providing a parallel-walled chamber intersecting its bore and extending oppositely equal distances therefrom; a pair of superposed contacting plates within said chamber extending between its top, bottom, and side walls; and external means for longitudinally moving said plates oppositely equal distances; said plates having oppositely disposed pear-shaped orifices therethrough, of which the larger portions are adapted to register with said bore, and of which the peripheral surfaces of the smaller portions are adapted to oppositely seat upon the surface of a cylindrical object within said bore; and said plates, by their longitudinal movements and overlapping, being adapted to fully open and close said bore and to close the passage between said object and the wall of the bore.

5. A construction as set forth in claim 1 wherein the plates are of equal cross-section, and constrained to move equal distances, to maintain a constant volume of free space in each end of said chamber.

6. A construction as set forth in claim 2 wherein the plates are of equal cross-section, and are constrained to move equal distances; and wherein there are no spaces of variable volume in which extraneous material can be entrapped.

7. A construction as set forth in claim 1 in combination with external means for wholly filling the free spaces in each end of the chamber, and the communicating interstices, with grease, whereby extraneous material may be prevented from entering such spaces and finding lodgment therein.

HARRY A. GANT.
HARRY R. TIPTON.